US007955658B2

(12) United States Patent
Grasse et al.

(10) Patent No.: US 7,955,658 B2
(45) Date of Patent: Jun. 7, 2011

(54) BUILDING MATERIAL COMPOSITION, ESPECIALLY BITUMEN-FREE SEALANT

(75) Inventors: Manfred Grasse, Unna (DE); Udo Windhövel, Monheim (DE); Katharina Lehmkuehler, Hemer (DE); Caroline Pfefferle, Hamm (DE)

(73) Assignee: Henkel AG & Co. KGaA, Duesseldorf (DE)

( * ) Notice: Subject to any disclaimer, the term of this patent is extended or adjusted under 35 U.S.C. 154(b) by 354 days.

(21) Appl. No.: 12/092,894

(22) PCT Filed: Sep. 1, 2006

(86) PCT No.: PCT/EP2006/008545
§ 371 (c)(1), (2), (4) Date: Aug. 29, 2008

(87) PCT Pub. No.: WO2007/054148
PCT Pub. Date: May 18, 2007

(65) Prior Publication Data
US 2009/0155472 A1    Jun. 18, 2009

(30) Foreign Application Priority Data
Nov. 7, 2005   (DE) .................. 10 2005 053 336

(51) Int. Cl.
*B05D 5/00* (2006.01)
(52) U.S. Cl. .................................................. 427/385.5
(58) Field of Classification Search .................. None
See application file for complete search history.

(56) References Cited

U.S. PATENT DOCUMENTS

| | | | |
|---|---|---|---|
| 4,634,725 A | 1/1987 | Tsujii et al. | |
| 6,162,839 A * | 12/2000 | Klauck et al. | 521/83 |
| 6,514,595 B1 * | 2/2003 | Sprouts | 428/143 |
| 6,565,645 B1 * | 5/2003 | Klein et al. | 106/778 |
| 6,872,761 B2 * | 3/2005 | LeStarge | 523/218 |
| 2002/0170467 A1 * | 11/2002 | Naji et al. | 106/705 |

FOREIGN PATENT DOCUMENTS

| | | |
|---|---|---|
| DE | OS-26 43 501 | 5/1977 |
| DE | 44 16 570 A1 | 11/1995 |
| DE | 694 19 983 T2 | 9/1999 |
| DE | 101 50 601 A1 | 4/2003 |
| DE | 102 13 712 A1 | 10/2003 |
| DE | 102 39 631 A1 | 3/2004 |
| DE | 20 2005 015642 U1 | 4/2006 |
| DE | 10 2005 01037 A1 | 9/2006 |
| EP | 0 146098 A2 | 6/1985 |
| EP | 0 556 414 A1 | 5/1994 |
| FR | 2 175 056 A1 | 10/1973 |
| JP | 53132054 A | 11/1978 |
| WO | WO 2006/037144 A2 | 4/2006 |

OTHER PUBLICATIONS translation of JP53-132054, Nov. 1978.*
International Search Report dated Feb. 15, 2007.

* cited by examiner

*Primary Examiner* — Erma Cameron
(74) *Attorney, Agent, or Firm* — James E. Piotrowski; Steven C. Bauman

(57) ABSTRACT

The present disclosure provides a building material composition which is suitable in particular for use as a bitumen-free sealant for sealing structures and contains a polymer dispersion or a corresponding redispersion powder, in particular based preferably on emulsion polymers which are redispersible in an aqueous medium, together with polystyrene particles, hollow ceramic and synthetic microspheres and, if appropriate, at least one binder and, if appropriate, further additives. The sealant according to the invention can in principle be formulated as a 1C or 2C application system. In addition to excellent sealing properties, as can conventionally be achieved only with bitumen-containing sealants, the bitumen-free building material composition according to the invention shows in particular excellent shrinkage behavior after application.

7 Claims, No Drawings

BUILDING MATERIAL COMPOSITION, ESPECIALLY BITUMEN-FREE SEALANT

CROSS REFERENCE TO RELATED APPLICATIONS

This application is the U.S. National Stage of PCT International Application No. PCT/EP2006/008545 filed on Sep. 1, 2006, which claims the benefit of German Patent Application No. 10 2005 053 336.1 filed on Nov. 7, 2005, the specifications of each of which are incorporated herein in their entirety.

The present invention relates to a building material composition, in particular bitumen-free sealant (sealing compound) and the use thereof, in particular for purposes of sealing structures, and a corresponding method for protecting or for sealing structures or components with the use of such a building material composition.

In the sealing of structures, in particular for sealing and protecting structures and components in contact with earth, such as outside walls of cellars, damp rooms, retaining walls and the like, but also for roof sealing purposes, it is possible in principle to use different sealing systems, namely on the one hand bitumen-containing compounds and sheet systems and on the other hand cement-containing systems or mineral sealing slurries. There are also sealing systems based on plastic-modified thick bitumen coatings (KMB) which form so to speak a "hybrid form" and consequently occupy a certain intermediate position.

The requirements which the various abovementioned sealing systems have to meet with regard to the sealing of structures are specified by various standards and guidelines, for example in DIN 18195, "Bauwerksabdichtungen [Sealing of structures]", parts 1 to 10 (parts 1 to 6: August 2000 edition; part 7: June 1989 edition; parts 8 to 10: March 2003 edition), DIN 18195-100 (draft, June 2003) and DIN 18195-101 (draft, September 2005), in the Guideline for the planning and implementation of seals of components in contact with earth using flexible sealing slurries (1st edition, date: January 1999), in the Guideline for the planning and implementation of seals of components using mineral sealing slurries (1st edition, date: May 2002) and in the Guideline for the planning and implementation of seals with plastic-modified thick bitumen coatings (KMB) (2nd edition, date: November 2001).

Cement-containing systems or mineral sealing slurries have the advantage of being environmentally friendly but are only poorly processable or capable of being applied as thick layers, so that they are not suitable for application of thick layers on perpendicular surfaces, such as walls. Consequently, primarily bitumen-containing seals, usually based on thick bitumen coatings and, in the case of roof seals, also based on bitumen roof sheets, are currently used in the sealing of structures, both for sealing and protection of structures and components in contact with earth, such as outside walls of cellars, damp rooms, retaining walls and the like, and in roof sealing.

The corresponding bitumen formulations of the prior art can be used in principle in one- or two-component form. One-component thick bitumen coatings harden or form films purely physically by evaporation of water or solvents, whereas two-component thick bitumen coatings usually consist of a base component based on a generally ionic bitumen emulsion and a hardener component, it generally being possible to use a mixture of fillers, such as, for example, quartz sand and Portland cement and/or high-alumina cement, as the hardener component.

Although the use of bitumen is relatively economical, bitumen in vapor and aerosol form is now classed as carcinogenic for humans, so that there is a possibility that bitumen as such might also be classed as carcinogenic in future, which would then prevent the use of bitumen for purposes of the sealing of structures.

There have therefore already been numerous efforts in the prior art to provide sealing systems which manage at least substantially without bitumen. A disadvantage of most bitumen-free sealants of the prior art is that, owing to the use of expensive raw materials or expensive starting chemicals, they are as a whole relatively expensive, which often prevents their applicability in the building trade. In addition, most systems have a very complex chemistry, which is equally disadvantageous with regard to practice-oriented handling. A multiplicity of bitumen-free sealing systems of the prior art moreover rely on reactive systems which complicate the handling in practice. Moreover, most bitumen-free sealants do not achieve the efficiency of the conventional bitumen sealants.

A number of bitumen-free sealants of the prior art are based on epoxy resin systems. However, epoxy resins are not only relatively expensive and moreover environmentally harmful but also relatively complicated to handle during the processing of the sealant.

Thus, DE 101 50 601 A1 describes a two-component composition for sealing structures and components based on an epoxy resin of the bisphenol A or bisphenol F type and having an amine hardener reactive therewith in the other component, in addition to various other constituents, such as fillers, polystyrene beads, cement-containing binders, additives, plasticizers, polymer dispersions and the like. Owing to the reactivity of the system, it is essential to provide it as a two-component composition which is mixed together in the appropriate ratios only immediately before use. The incorporation of the polystyrene beads into the powder component moreover has the disadvantage that there is a certain tendency to separation during mixing together of the two components, owing to the poor wetting of the polystyrene beads.

DE 44 16 570 A1 relates to a resilient molding material and/or sealing compound comprising recycled waste rubber material and/or flexible plastic parts for use as wearing layers, protective surfaces, composites or the like. The resilient molding material and/or sealing compound consists of from 0.1 to 0.8 part of rubber granules of different particle sizes up to not more than 2 mm diameter, which is bound with about 0.9 to 0.2 part of water-soluble acrylate dispersion including additives. The molding material and/or sealing compound must be sequentially compacted before their use under dynamically changing pressure up to 10 bar in small volume units, which is detrimental with regard to use under conditions close to practice.

DE 694 19 983 T2 or the corresponding EP 0 632 170 B1 describes a prefabricated multistage structure for use in the area of building construction for sealing of roofs and of roof coverings with a bitumen-based blend layer into which a stiffening material is embedded, and with an outer layer, the outer layer consisting of a material with which shaping is possible and which increases the dimensional stability of the end product. Furthermore, the structure may have an additional resin layer comprising elastomers and copolymers in a water emulsion, which resin layer is present between the blend layer and the preshaping layer. A particular disadvantage of this product is the compulsory use of bitumen. In addition, the structure is used only in prefabricated form so that sealing of uneven surfaces is not always ensured.

EP 0 556 414 A1 relates to a permanently elastic two-component multipurpose material which comprises a reactive system based on bisphenol and/or on an anionic bitumen emulsion with appropriate hardeners. This is a reactive epoxy resin-based system which moreover has no hydraulic binder, in particular no cement. In addition, it is not imperative for the system to be bitumen-free.

U.S. Pat. No. 4,634,725 A describes a crack-resistant coating material for building structures for purposes of crack bridging for masonry, which contains a dispersion of spherical particles in a resin/hardener solution of defined viscosity. The spherical particles having a diameter of from 1 to 6 mm are homogeneously dispersed in the resin/hardener solution. The consistency permits use on vertical surfaces without running, it being said that cracks up to 5 mm in width are bridged.

JP 53132054 A relates to a light filler for concrete renovation which contains foamed polystyrene beads, glass and hardener. This is a pure concrete renovation product. Either an organic binder or an organic dispersion or alternatively a cement paste is used as hardening raw material.

Finally, DE-A 26 43 501 relates to a cement comprising adhesives and fillers which, owing to the incorporation of an emulsifier, is water-miscible. Flowable asphalt, turpentine, rubber and polymethyl methacrylate are mentioned as adhesives. The cement can be used, for example, as a joint filler, as a substitution for mortar, as a seal or for filling between two materials.

The problem on which the present invention is based is therefore the provision of a bitumen-free building material composition which is suitable as a sealing compound or sealant in the sealing of structures. In particular, such a building material composition should at least substantially avoid or at least mitigate the disadvantages of the prior art which are described above.

The applicant has now surprisingly found that the problem described above can be solved by formulating a polymer dispersion together with a mixture of light fillers based on polystyrene particles, hollow ceramic microspheres and hollow synthetic microspheres and, if appropriate, with at least one binder.

According to a first aspect of the present invention, the present invention therefore relates to a building material composition, in particular a bitumen-free sealant, the building material composition containing at least one polymer dispersion or one corresponding redispersion powder (in particular based preferably on emulsion polymers redispersible in an aqueous medium),
polystyrene particles,
hollow ceramic microspheres,
hollow synthetic microspheres and
if appropriate, at least one binder.

Surprisingly, a combination of the abovementioned ingredients leads to a bitumen-free building material composition which is outstandingly suitable for the sealing of structures and, in addition to excellent sealing properties as can be achieved according to the prior art only with bitumen-containing sealants, has in particular excellent shrinkage behavior after its application in that at least substantially no shrinkage is observed during the drying and hardening. This is described below.

A substantial constituent of the building material composition according to the invention is a polymer dispersion or a corresponding redispersion powder. The term polymer dispersion is an overall designation for dispersions (lattices) of finely divided, natural and/or synthetic polymers usually in aqueous, more rarely nonaqueous, dispersing media; this term therefore covers dispersions of polymers, such as natural rubber ("rubber latex") and synthetic rubber ("synthetic latex"), and of synthetic resins ("synthetic resin dispersions") and plastics ("plastic dispersions"), such as polymers, polycondensates and polyaddition compounds. For further details regarding the term polymer dispersions, reference may be made, for example, to Römpp Chemielexikon [Römpp Chemistry Lexicon], 10th edition, volume 5, 1998, Georg Thieme Verlag, Stuttgart/New York, pages 3469/3470, keyword: "Polymerdispersionen [Polymer dispersions]", and to the literature referred to there.

According to the invention, a polymer dispersion is preferably used. However, instead of the polymer dispersion, it is also possible in principle to use a corresponding redispersible, in particular water-dispersible, dispersion powder based on the same polymers, from which the polymer dispersion can then be obtained by mixing with the corresponding dispersing medium, preferably water. For reasons of simplicity, only the term polymer dispersions is generally used below, but all statements below, in particular with regard to the characterization of these polymer dispersions (e.g. physical and chemical properties, parameters, structure, composition, etc.), do of course also apply accordingly to the respective corresponding redispersion powders, even if this is not explicitly mentioned. Such redispersion powders are known as such to the person skilled in the art and are also commercially available (e.g. from Wacker, Celanese, Rhodia, Elotex, Dow Chemical, BASF, Vinavil, Unimex, etc.), so that there is no need to go into further details of the technology of the redispersion powders here. According to the invention, redispersion powders used are in particular those based preferably on emulsion polymers redispersible in an aqueous medium.

The use of a polymer dispersion, preferably of an aqueous dispersion, has—in addition to further other advantages (e.g. price, better mixability and wettability of the other ingredients, etc.)—in particular the decisive advantage over redispersion powders that the corresponding amount of mixing water can be specified so that metering errors during mixing are eliminated.

Advantageously, the polymer dispersion used according to the invention is a plastic dispersion. Owing to the above-described disadvantages of epoxy resin-based systems, a non-epoxy resin-based polymer dispersion, preferably a non-epoxy resin-based plastic dispersion, is preferably used according to the invention. For the incorporation of the further ingredients and for improved use, it is advantageous if the polymer dispersion used according to the invention is additionally ionically modified, preferably anionically modified.

Polymer dispersions preferably used according to the invention are formulated as a water-based or aqueous, preferably ammonia-free dispersion system.

Usually, the polymer dispersions used according to the invention have a solids content of (DIN ISO 1625-D) of from 30 to 75%, in particular from 40 to 65%, preferably from 50 to 60%, based on the polymer dispersion.

In general, the polymer particles of the polymer dispersions used according to the invention have particle sizes (particle diameters), in particular mean particle sizes, of from 0.001 to 5 μm, in particular from 0.01 to 3 μm, preferably from 0.05 to 2 μm, particularly preferably from 0.1 to 1.0 μm.

Polymer dispersions preferred according to the invention have a pH (DIN ISO 976) of in general from 7.0 to 8.5. In addition, polymer dispersions preferably used according to the invention have a viscosity of from 10 to 500 mPa·s, in particular from 50 to 200 mPa·s, at 23° C. Furthermore, polymer dispersions preferably used according to the invention have a density (DIN 53217, ISO 2811) of from 0.9 to 1.1 g/cm$^3$, in particular from 0.95 to 1.05 g/cm$^3$. Polymer dispersions preferably used according to the invention additionally have a minimum film formation temperature (DIN ISO 2115) below 5° C., in particular below 1° C.

For optimum performance characteristics, it is advantageous if the films obtainable starting from the polymer dispersion used according to the invention have a glass transition temperature $T_g$ (DSC) below −5° C., in particular in the range from −5° C. to −50° C., preferably from −20° C. to −40° C., particularly preferably about −30° C.; in principle, however, it is also possible to use polymers having higher glass transition temperatures of the resulting films provided that these are combined with suitable plasticizers. Furthermore, it is advantageous if the films obtainable starting from the polymer dispersion used according to the invention have a breaking strength (based on DIN 53455) of at least 0.1 N/mm$^2$, in particular at least 0.2 N/mm$^2$, and/or an elongation at break (based on DIN 53455) of at least 1000%, preferably at least 2000%.

Alkali-resistant or hydrolysis-stable polymer dispersions or polymers are usually used according to the invention.

In particular, aqueous polymer dispersions of a polymer or of a mixture of at least two polymers are preferably used as polymer dispersions. The polymers or the mixture of two or more polymers preferably comprise or comprises polymers obtained by free radical polymerization, as can be obtained in particular from ethylenically unsaturated monomers. The polymer preferably contains so-called main monomers, in particular selected from $C_1$-$C_{20}$-alkyl (meth)acrylates, vinyl esters of carboxylic acids containing up to 20 C atoms, vinylaromatics having up to 20 C atoms, ethylenically unsaturated nitriles, vinyl halides, nonaromatic hydrocarbons having at least 2 conjugated double bonds or mixtures of these monomers. For example, alkyl acrylates or alkyl methacrylates having $C_1$-$C_{12}$-alkyl radicals, such as methyl methacrylate, methyl acrylate, n-butyl acrylate, ethyl acrylate and 2-ethylhexyl acrylate, may be mentioned specifically. In particular, polymers which can be obtained by polymerization of mixtures of alkyl acrylates and alkyl (meth)acrylates are also suitable. For the preparation of polymers suitable according to the invention, for example, the vinyl esters of carboxylic acids having 1 to 20 C atoms are also suitable. For the preparation of polymers suitable according to the invention, for example, vinyl laurate, vinyl stearate, vinyl propionate, vinyl versatate or vinyl acetate or mixtures of two or more of the abovementioned compounds are suitable. For example, vinyltoluene, α- and p-methylstyrene, α-butylstyrene, 4-n-butylstyrene, 4-n-decylstyrene and styrene are suitable as vinylaromatic compounds. Examples of suitable nitriles are acrylonitrile and methacrylonitrile. For the preparation of polymers suitable according to the invention, vinyl halides, for example ethylenically unsaturated compounds substituted by chlorine, fluorine or bromine, such as vinyl chloride or vinylidene chloride, or mixtures thereof, are likewise suitable. For the preparation of polymers suitable according to the invention, nonaromatic hydrocarbons having 2 to 8 C atoms and at least two olefinic double bonds, such as butadiene, isoprene and chloroprene, are additionally suitable. Further monomers, which may be present in the polymer or polymers in an amount of, for example, from 0 to 40% by weight, preferably from 0 to 20% by weight and particularly preferably from 0.2 to 10% by weight, are in particular $C_1$-$C_{10}$-hydroxyalkyl (meth)acrylates, (meth)acrylamide and the derivatives thereof substituted by $C_1$-$C_4$-alkyl on the nitrogen, ethylenically unsaturated carboxylic acids, dicarboxylic acids, the monoesters and anhydrides thereof, e.g. (meth)acrylic acid, maleic acid, fumaric acid, maleic anhydride, maleic and fumaric acid monoesters and itaconic acid.

Polymer dispersions or corresponding redispersion powders based on vinyl-, (meth)acrylate-, styrene-, butadiene- and/or ethylene-based polymers are preferably used according to the invention, where the term polymers is to be understood according to the invention in a wide sense and comprises not only polymers in the narrower sense but also copolymers, terpolymers, etc. In particular, polymer dispersions or corresponding redispersion powders which are vinyl- or acrylate-based, such as vinyl acetate, vinyl propionate, vinyl laurate, vinyl versatate, vinyl chloride, vinylidene chloride and/or straight-chain or branched vinyl esters having 1 to 20 C atoms, acrylic and methacrylic monomers (in particular esters), styrene, butadiene and/or ethylene are used.

As described above, a very wide range of systems may be used as polymer dispersions. Dispersions based on styrene/(meth)acrylate copolymers, styrene/butadiene copolymers and/or vinyl acetate/ethylene copolymers are preferably used as polymer dispersions. Particularly advantageous properties are achieved with polymer dispersions of styrene-acrylate copolymers (e.g. Acronal® DS 3511 or Acronal® S 456 from BASF Aktiengesellschaft, Ludwighafen, or Mowilith LDM 6482 from Celanese, Frankfurt); this is because the applicant has surprisingly found that, in the building material composition according to the invention, dispersions based on styrene/acrylate copolymers lead to particularly good stability and water resistance of the resulting seal or of the resulting film since the resulting film remains particularly consistent and coherent. Nevertheless, in principle all abovementioned plastic dispersions are suitable for use in the building material composition according to the invention.

The abovementioned polymer dispersions contain no epoxy resins. Consequently, they are environmentally friendly and can be processed and handled in a more practice-oriented or simple manner. In addition, the price of the building material composition according to the invention is substantially reduced thereby compared with epoxy resin-based systems.

Regarding the polystyrene particles used according to the invention, they may be present in particular in the form of so-called polystyrene beads or small polystyrene spheres or in the form of polystyrene granules. Polystyrene particles preferably used according to the invention have particles sizes (particle diameters) in the range from 0.1 to 3.0 mm, in particular from 0.2 to 2.0 mm, preferably from 0.5 to 1.5 mm, and have bulk densities in general of from 5 to 30 g/l, in particular from 7.5 to 15 g/l, preferably from 10 to 13 g/l.

In an embodiment which is particularly preferred according to the invention, the polystyrene particles may be formed from expandable and/or expanded polystyrene. Expandable polystyrene contains in general at least one suitable blowing agent, preferably an alkane, in particular pentane and/or pentane isomers Polystyrene particles particularly preferred according to the invention are obtainable, for example, under the name "NOVA Chemicals®" from NOVA Brands Ltd.

Regarding the hollow ceramic microspheres used according to the invention, they are formed in general on the basis of silicates, in particular aluminosilicates and/or borosilicates, preferably aluminosilicates. In addition, smaller amounts of other mineral oxides, in particular $Fe_2O_3$ and $TiO_2$, may also be present, but with the proviso that the aluminosilicate fraction, i.e. the proportion of $SiO_2$ and $Al_2O_3$ together, is more than 95%.

Hollow ceramic microspheres suitable according to the invention generally have particle sizes (particle diameters) of from 1 to 500 μm, in particular from 1 to 350 μm, preferably from 10 to 300 μm, and generally have mean particle sizes of from 100 to 160 µm, in particular from 120 to 150 µm, preferably from 125 to 140 µm.

In the present invention, it is advantageous if the hollow ceramic microspheres used have bulk densities of from 100 to 600 g/l, in particular from 250 to 500 g/l, preferably from 350 to 475 g/l, and/or bulk volumes of from 1800 to 3000 ml/1000 g, in particular from 2000 to 2100 ml/1000 g, preferably from 2100 to 2800 ml/1000 g.

Furthermore, hollow ceramic microspheres which can be used according to the invention have in general densities in the range from 0.5 to 1.0 $g/cm^3$, in particular from 0.6 to 0.9 $g/cm^3$, preferably from 0.7 to 0.8 $g/cm^3$. Furthermore, hollow ceramic microspheres which can be used according to the invention have in general Mohs' hardnesses of at least 4, in particular at least 4.5, preferably at least 5, particularly preferably in the range from 5 to 6, and/or compressive strengths of at least 12 MPa, in particular at least 13 MPa, preferably at least 14 MPa.

In order on the one hand to ensure a certain mechanical stability of the hollow ceramic microspheres and on the other hand to reduce the specific gravity of the hollow ceramic microspheres, hollow ceramic microspheres preferably used according to the invention have a shell diameter which accounts for only from 5 to 15%, preferably only about 10%, of the total hollow ceramic microspheres, i.e. in other words from 85 to 95%, preferably about 90%, of the hollow ceramic microspheres are formed by the cavity formed or enclosed by the shell.

Hollow ceramic microspheres suitable according to the invention are available from a number of suppliers, for example from Omega Minerals Germany GmbH, Advanced Minerals Ltd., Trelleborg Fillite Ltd., Envirospheres Pty. Ltd. and AshTek Corporation. Hollow ceramic microspheres particularly preferably used according to the invention are sold by Omega Minerals Germany GmbH, in particular the products of the series "Omega-Spheres", e.g. "Omega-Spheres W300", or "Isospheres SG 300".

In the present invention, it is possible completely or partly to replace the proportion of hollow ceramic microspheres by hollow glass microspheres, However, hollow ceramic microspheres are advantageously used.

Regarding the hollow synthetic microspheres used according to the invention, these are generally formed on the basis of organic polymers. For example, organic polymers based on monomers from the group consisting of vinylidene chloride, acrylonitrile and/or methyl (meth)acrylates, preferably vinylidene chloride/acrylonitrile copolymers, are used; such products are sold, for example, by Akzo Nobel ("Expancel® WE") or Sika Addiment GmbH. Alternatively, such hollow synthetic microspheres may also be based on phenol resins (e.g. products from Asia Pacific Microspheres Sdn. Bhd., Malaysia). However, hollow synthetic microspheres based on vinylidene chloride/acrylonitrile copolymers or based on polymers which are based on the monomers vinylidene chloride and/or acrylonitrile and/or methyl (meth)acrylate are preferably used according to the invention.

Regarding the hollow synthetic microspheres used according to the invention, these generally have particle sizes (particle diameters) of from 1 to 300 µm, in particular from 1 to 200 µm, preferably from 5 to 150 µm, particularly preferably from 10 to 150 µm, and/or mean particle sizes of from 10 to 100 µm, in particular from 20 to 80 µm, preferably from 20 to 60 µm.

The hollow synthetic microspheres which can be used according to the invention may be present, for example, in expandable and/or expanded form. Such hollow synthetic microspheres, in particular in expandable form, may contain a blowing agent, preferably an alkane, in particular pentane and/or pentane isomers, the blowing agent causing the expandable spheres to expand on heating above a certain temperature and thus bringing them to the final particle size.

Hollow synthetic microspheres preferably used according to the invention have a solids content of from 5 to 20%, in particular from 7 to 17%, based on the hollow synthetic microspheres. The remaining proportion is accounted for by the cavity enclosed by the shell material.

As described above, the building material composition according to the invention, in particular the bitumen-free sealant, contains not only the ingredients described above but also, if appropriate, at least one binder. According to the invention, the term binder is understood in particular as an overall designation for those substances which bind substances of the same or different type to one another. In the present invention, hydraulic, latently hydraulic or nonhydraulic binders can be used, in particular hydraulic and latently hydraulic binders, particularly preferably hydraulic binders. Such binders, which harden only in air ("air binders", such as gypsum, Soral cement, anhydrite, magnesia binder, white lime, etc.), are referred to as nonhydraulic binders, whereas, for example, hydraulic lime and many other cements are referred to as hydraulic binders which also set under water. If this binding takes place only by the action of additives or activators, then so-called latently hydraulic binders (e.g. blast furnace slag) are referred to. For further details regarding the term binder, reference may be made, for example, to Römpp Chemielexikon [Römpp Chemistry Lexicon], 10th edition, volume 1, 1996, Georg Thieme Verlag, Stuttgart/New York, pages 433/434, keyword: "Bindemittel [Binders]", and to the literature referred to there.

Binders suitable according to the invention may be selected from the group consisting of cements; lime; white lime; calcium sulfates, such as anhydrite and gypsum; slags, such as blast furnace slags; filter ashes; and mixtures of the abovementioned compounds.

In an embodiment which is particularly preferred according to the invention, a cement is used as the binder. For further details in this respect regarding the term cement, reference is made to "Römpp Chemielexikon [Römpp Chemistry Lexicon]", 10th edition, volume 6, 1999, Georg Thieme Verlag, Stuttgart/New York, pages 5049 to 5051, keyword: "Zement [Cement]" and to the literature referred to there. So-called Portland cement is particularly preferably used.

In the building material composition according to the present invention, the binder, in particular the cement, performs a dual function: firstly, the binder "breaks" so to speak the polymer dispersion so that a film formation process can begin after application of the building material composition according to the invention, and secondly the binder binds excess water which is not removed by a physical process, in particular by evaporation, during drying. In particular, the binder optionally used according to the invention produces increased strength and improved cohesion, in particular increased early stability, of the building material composition applied after its use or application.

The incorporation of a binder component, in particular of cement, leads not only to faster "breaking" of the dispersion and associated better film formation properties but also to faster or shorter hardening times and moreover to an improvement in the shrinkage behavior.

In addition to the ingredients or components described above, the building material composition according to the present invention can also contain further ingredients and/or additives. These may be selected in particular from the group consisting of wetting agents, antifoams, preservatives, thickeners, plasticizers, inorganic fillers, mineral aggregates, solidification retarders, solidification accelerators, fibers, pigments, etc. and mixtures of the abovementioned substances.

If, for example, an additional thickener is added to the building material composition according to the invention for adjusting the flowability or viscosity, advantageously methylhydroxyethylcellulose ("Tylose") and/or xanthan gum, preferably methylhydroxyethylcellulose and xanthan gum, can be used. The use of xanthan gum in the building material composition according to the invention has the particular advantage that the xanthan gum imparts to the composition not only a thickening effect but additionally thixotropic properties, which is particularly advantageous during use. Instead of xanthan gum, it is equally possible to add silica, which—similar to xanthan gum—serves both as a thickener and as a standardizing agent or thixotropic agent. Mixtures of xanthan gum and silica, if appropriate together with methylhydroxyethylcellulose, can also be used as a thickener.

In addition, recycled materials, for example rubber granules, etc., can also be incorporated into the building material composition according to the invention.

In principle, the building material composition according to the invention can be formulated either as a one-component system (1C system) or as a two-component system (2C system). The formulation as a two-component system is preferred.

In the case of the formulation as a one-component system, a redispersion powder of the abovementioned type is preferably used as the polymer component. In this case, the building material composition according to the invention can be formulated in particular as a 1C dry system or 1C powder system, i.e. can consist exclusively of a single solid component or of a single solid mixture which is then mixed with the required amount of water before its use.

In the case of the formulation preferred according to the invention as a two-component system, a polymer dispersion is usually used as the polymer component, and polymer dispersion on the one hand and any binder present on the other hand are advantageously present in different components, the polymer dispersion generally being a constituent of a liquid component, whereas the binder is in principle a constituent of a solid or powder component or of a liquid component, but preferably a constituent of a solid or powder component. In principle, however, it is also possible in this embodiment to use the corresponding redispersion powder instead of the polymer dispersion, but this is less preferred according to the invention; however, the 2C system preferred according to the invention is described below exclusively on the basis of the polymer dispersion, it being self-evident to the person skilled in the art that he can also use the corresponding redispersion powder instead of the polymer dispersion, provided that this is mixed with the appropriate amount of water before use.

According to a particular embodiment of the present invention, the present invention therefore relates to a building material composition, in particular a bitumen-free sealant, in particular as described above, the building material composition being formulated as a two-component system (2C system), the two-component system comprising firstly a component (A), in particular as a liquid component, and secondly a component (B), in particular as a dry or powder component or as a liquid component, preferably as a dry or powder component, the component (A) containing, based in each case on the amount of the component (A), at least one polymer dispersion, in particular in amounts of from 2 to 100 parts by weight, preferably from 30 to 80 parts by weight, particularly preferably from 40 to 60 parts by weight, polystyrene particles, in particular in amounts of from 0.01 to 10 parts by weight, preferably from 0.05 to 5 parts by weight, particularly preferably from 0.1 to 2.5 parts by weight, hollow ceramic microspheres, in particular in amounts of from 0.1 to 60 parts by weight, preferably from 0.2 to 50 parts by weight, particularly preferably from 0.5 to 10 parts by weight, hollow synthetic microspheres, in particular in amounts of from 0.01 to 30 parts by weight, preferably from 0.05 to 15 parts by weight, particularly preferably from 0.1 to 5 parts by weight, if appropriate, at least one inorganic filler or mineral aggregate, preferably calcium carbonate and/or $SiO_2$, $SiO_2$ preferably in the form of quartz sand, in particular in amounts of, altogether, from 2 to 160 parts by weight, preferably from 5 to 100 parts by weight, particularly preferably from 10 to 50 parts by weight, if appropriate, at least one further additive, in particular from the group consisting of wetting agents, antifoams, preservatives and/or thickeners, in particular in amounts of, altogether, from 0.01 to 5 parts by weight, preferably from 1 to 5 parts by weight, and if appropriate, additional water, in particular in amounts of from 0.1 to 10 parts by weight, preferably from 1 to 5 parts by weight, and the component (B), based in each case on the amount of the component (B), containing at least one binder, preferably cement, in particular in amounts of from 1 to 100 parts by weight, preferably from 5 to 50 parts by weight, particularly preferably from 5 to 15 parts by weight, if appropriate, at least one inorganic filler or mineral aggregate, preferably calcium carbonate, preferably in the form of limestone powder and/or $SiO_2$, $SiO_2$ preferably in the form of quartz sand, in particular in amounts of, altogether, from 2 to 200 parts by weight, preferably from 50 to 150 parts by weight, particularly preferably from 80 to 100 parts by weight.

In the embodiment which is less preferred according to the invention, according to which the component (B) is also formulated as a liquid component, the component (B) may contain a dispersant, in particular a dispersant inert to the binder, which may be selected in particular from the group consisting of organic solvents, such as organic hydrocarbons, oils, in particular mineral oils and liquid paraffins, plasticizers and the like, where the boiling point or the boiling range of these organic compounds at atmospheric pressure should be at least 200° C. The amount of dispersant(s) in the component (B) can vary within wide ranges in this embodiment; in particular, it is from 1 to 1000 parts by weight, in particular from 50 to 500 parts by weight, particularly preferably from 100 to 200 parts by weight.

The component (A) on the one hand and the component (B) on the other hand can be used in variable mixing ratios. For example, the mixing ratio of (A):(B) may vary within the range from 30:1 to 1:1, in particular from 10:1 to 1:1, preferably from 4:1 to 1:1, preferably from 3:1 to 1:1. According to a particularly preferred development, the mixing ratio (A):(B) is about 2:1.

For purposes of use, in the case of the two-component system, the two components (A) and (B) are advantageously brought into contact immediately before use, in particular mixed or homogenized with one another, so that an intimate or homogeneous mixture of the components (A) and (B) is present on use.

As described above, both inorganic fillers or mineral aggregates ("heavy fillers" or "heavy aggregates") may advantageously be added both to the component (A) and to the component (B). In particular, a procedure is adopted in which relatively fine-particle aggregates or fillers, in particular having a screening curve of from 0 to 0.5 mm, are added to the liquid component (A), while relatively coarse-particle aggregates or fillers, in particular having a screening curve of from 0 to 1 mm, tend to be added to the solid or powder component (B). In this way, a continuous or nonintermittent screening line can be established. In this way, a reasonable packing density without inclusion of air is achieved and the compressive strength or stability of the end product is increased, which is important particularly if the building material composition according to the present invention is used as a sealant in the region in contact with earth.

According to the invention, it is preferred if the liquid component (A) generally has a density of from 0.5 to 1.0 kg/l, in particular from 0.6 to 0.8 kg/l, preferably from 0.70 to 0.80 kg/l, while the component (B), in particular as solid component (B), has a density of from 0.8 to 2.5 kg/l, in particular from 1.5 to 2.1 kg/l, preferably from 1.60 to 1.70 kg/l. In particular, the density of the solid component (B) should be at least 1.5 times, in particular at least 1.7 times, in particular at least 2 times, the density of the liquid component (A). This permits rapid and homogeneous, in particular dust-free, stirring or mixing of the two components before use.

The fact that, for the case of the two-component system, the polystyrene particles, the hollow ceramic microspheres and the hollow synthetic microspheres are present in the liquid component (A) has the advantage that separation of these constituents does not take place. Rather, owing to the large density difference—the heavy ingredients and aggregates are present substantially in the solid component (B) while the light ingredients and aggregates are present in the liquid component (A)—excellent miscibility of the two components (A) and (B) with one another is achieved, which permits rapid use.

The building material composition according to the invention, in particular the bitumen-free seal according to the present invention, has altogether a multiplicity of advantages:

Firstly, it is environmentally friendly and economical owing to the ingredients, which favors its use. After its application as a sealant, it shows substantially no shrinkage.

The building material composition according to the invention—independently of its formulation as one-component or two-component system—shows excellent sealing properties as can conventionally be achieved only with bitumen-containing sealants according to the prior art. In particular, the building material composition according to the invention meets the requirements as set in DIN 18195, mentioned at the outset, for bitumen-containing sealants and in the corresponding guidelines for cement-containing or mineral sealing slurries and for plastic-modified thick bitumen coatings.

The building material composition according to the invention is suitable for sealing structures, in particular in the region in contact with earth, but also for roof sealing. In particular, the building material composition according to the invention can also be processed or applied in thick layers, in particular on perpendicular walls.

Surprisingly, although it is formulated on the basis of relatively expensive polymer dispersions, the building material composition according to the invention has been developed at the same price level as bitumen emulsions. What is furthermore surprising is that the building material composition according to the invention can be very rapidly mixed (i.e. stirring of the liquid component with the powder component), in particular without much development of dust, in the case of a two-component formulation. What is furthermore surprising is that, even in larger layer thicknesses, virtually shrinkage-free hardening of the seal takes place; this is particularly important because it provides a high degree of certainty because as a consequence shrinkage cracks which would inevitably lead to leaks cannot occur.

The substantially shrinkage-free drying or hardening can be illustrated, for example, as follows: if the building material composition according to the invention is applied in the wet state with a layer thickness of, for example, about 3 mm, the result is a coating which has a layer thickness of the same order of magnitude (i.e. about 3 mm) also in the dried or hardened state; consequently, excellent cohesion of the seal according to the invention with avoidance of any shrinkage cracks is achieved. Sealing systems of the prior art on the other hand generally exhibit shrinkage of about 20 to 25% on drying or hardening: if systems of the prior art are applied, for example, in the wet state with a layer thickness of 4 mm, sealing layers of only 3 mm in the dry or hardened state result, which leads in practice to significant cracking if this phenomenon is not sufficiently taken into account during use.

The abovementioned peculiarities are due to the special formulation of the building material composition according to the invention, in particular to the combination of a generally aqueous polymer dispersion with in turn a combination of special light aggregates, namely polystyrene particles, hollow synthetic microspheres and hollow ceramic microspheres, and, if appropriate, with at least one binder. The applicant has surprisingly found that the effects described above can be achieved only with this synergistic combination.

The incorporation of light fillers based on styrene particles and hollow ceramic and synthetic microspheres moreover reduce the weight of the building material composition according to the invention, i.e. they make them clearly lighter and moreover reduces the pull-off resistance during application. In particular, the polystyrene particles in the form of small spheres or beads ensure a certain rolling effect during application.

A further advantage of the present invention is that in general it is usually possible to dispense with a plasticizer or a plasticizer component.

Overall—in addition to excellent sealing properties, as can conventionally be achieved only with bitumen-containing sealants—the bitumen-free building material composition according to the invention thus exhibits in particular excellent shrinkage behavior after application.

Independently of whether the building material composition according to the invention is formulated as a one-component or two-component system, certain light aggregates, for example from the group consisting of perlites, such as expanded perlite, expanded glass, expanded mica (vermiculite), expanded shale, expanded clay, sintered anthracite fly ash, pumice, such as natural pumice and foamed slag, brick chips, tuff, lava and lava slag and bentonites, can also be added in addition to the abovementioned ingredients.

Furthermore—according to a second aspect of the present invention—the present invention relates to the use of a building material composition, as defined above, according to the present invention for sealing structures, in particular for the sealing and/or for the protection of structures and components in contact with earth and of roofs (flat roofs).

Furthermore—according to a third aspect of the present invention—the present invention relates to a method for the sealing and/or for the protection of structures or of components, including roofs, a building material composition according to the present invention, as defined above, being applied to the relevant structures or components in sufficient thickness and then being left to dry and harden.

In the use according to the invention and in the method according to the invention, the building material composition according to the invention is generally applied with a layer thickness (wet thickness) of from 0.1 to 10 mm, in particular from 1 to 5 mm, preferably from 2 to 4.5 mm.

Further embodiments, developments, modifications and variations of the present invention can be readily recognized and realized by the person skilled in the art on reading the present application without departing from the scope of the present invention.

The present invention is illustrated with reference to the following working example which, however, is by no means intended to limit the present invention.

WORKING EXAMPLE

A building material composition, in particular a bitumen-free sealant, according to the present invention is formulated as a two-component system (2C system) as follows:

| Component (A) (liquid component): | |
|---|---|
| polymer dispersion (aqueous, anionically modified, ammonia-free dispersion of styrene/acrylate copolymers) | 51% by weight |
| wetting agent (aqueous solution of a sodium polyacrylate) | 0.29% by weight |
| nonionic antifoam | 1.16% by weight |
| preservative | 0.15% by weight |
| mineral aggregate I (quartz sand ($SiO_2$)) | 19.3% by weight |
| mineral aggregate II (calcium carbonate) | 19.3% by weight |
| hollow ceramic microspheres based on aluminosilicate | 4.8% by weight |
| hollow synthetic microspheres | 0.96% by weight |
| Styropor beads (density: 13 g/l) (polystyrene particles) | 0.58% by weight |
| thickener I | 0.11% by weight |
| thickener II | 0.15% by weight |
| additional water | 2.2% by weight |
| | 100% by weight |

| Component (B) (solid or dry component): | |
|---|---|
| hydraulic binder (Portland cement) | 10% by weight |
| mineral aggregate I (quartz sand) | 77.50% by weight |
| mineral aggregate II (limestone powder = calcium carbonate) | 12.50% by weight |
| | 100% by weight |

The mineral aggregates of component (A) are present in a smaller particle size than the mineral aggregates of component (B).

The component (A) has a density of about 0.75 kg/l while the density of the component (B) is about 1.63 kg/l.

The abovementioned components (A) and (B) are mixed in a mixing ratio (A):(B) of about 2:1 so that a homogeneous mixture results.

The homogeneous mixture is then applied with a layer thickness of about 4 mm in the wet state to an 8 m×3 m wall surface. After drying and hardening, a uniform about 4 mm thick, crack-free, coherent sealing layer which protects the wall surface from the effect of moisture results. The sealed surface is free of any cracking.

The abovementioned experiment is repeated, but alternately the polystyrene component (comparative experiment I) or the hollow ceramic microspheres (comparative experiment II) or the hollow synthetic microspheres (comparative experiment III) are omitted in the liquid component (A). The procedure is the same as that described above. After application of the respective mixtures to the wall surface with 4 mm thickness in the wet state, cracking is observed due to resultant shrinkage in the case of each of the products without the abovementioned component. The dried and hardened sealing layers have a smaller thickness in each case substantially below 4 mm owing to the shrinkage.

The above working example impressively shows the efficiency of the building material composition according to the invention owing to the special combination of the abovementioned light fillers in a bitumen-free non-epoxy resin-based polymer dispersion Instead of the plastic dispersion used, it is alternatively possible to use a redispersion powder based on styrene/acrylate copolymers redispersible in an aqueous medium, which redispersion powder has then to be mixed with the corresponding amount of water before use. The use of a redispersion powder permits the formulation as a one-component system (1C system), provided that all other components are chosen as dry constituents.

The invention claimed is:

1. A bitumen-free building material composition comprising:
    at least one non-epoxy polymer dispersion or one non-epoxy redispersion powder comprising emulsion polymers redispersible in an aqueous medium,
    polystyrene particles,
    hollow ceramic microspheres,
    hollow synthetic microspheres, and
    optionally, at least one binder; formulated as a two-component system (2C system) and the polymer dispersion and the binder are present in different components of the two-component system.

2. The building material composition as claimed in claim 1, wherein the composition comprises a cement binder and further comprises a thickener selected from the group consisting of xanthan gum, silica and methylhydroxyethyl-cellulose.

3. A bitumen-free building material composition formulated as a two-component system (2C system), the two-component system comprising a component (A) as a liquid component, and a component (B) as a dry component,
    the component (A) containing, based in each case on the amount of the component (A),
    at least one non-epoxy polymer dispersion or one non-epoxy redispersion powder comprising emulsion polymers redispersible in an aqueous medium, in amounts of from 2 to 100 parts by weight,
    polystyrene particles, in amounts of from 0.01 to 10 parts by weight,
    hollow ceramic microspheres, in amounts of from 0.1 to 60 parts by weight,
    hollow synthetic microspheres, in amounts of from 0.01 to 30 parts by weight,
    optionally, from 2 to 160 parts by weight of at least one inorganic filler or mineral selected from the group consisting of calcium carbonate, $SiO_2$, $SiO_2$ in the form of quartz sand, or combinations thereof,
    optionally, at least one further additive selected from the group consisting of wetting agents, antifoams, preservatives and/or thickeners, in amounts of, altogether, from 0.01 to 5 parts by weight, and the component (B) containing, based in each case on the amount of the component (B), at least one cement binder, in amounts of from 1 to 100 parts by weight, optionally, from 2 to 200 parts by weight of at least one inorganic filler or mineral selected from the group consisting of calcium carbonate, limestone powder, $SiO_2$, $SiO_2$ in the form of quartz sand, or combinations thereof.

4. The building material composition as claimed in claim 3, wherein the component (A) and the component (B) are used in a mixing ratio of (A):(B) of from 30:1 to 1:1.

5. The building material composition as claimed in claim 3, wherein the component (A) has a density of from 0.5 to 1.0 kg/l, and the density of the component (B) is at least 1.5 times, the density of the component (A).

6. A bitumen-free building material composition formulated as a two-component system, the two-component system comprising a component (A) as a liquid component, and a component (B) as a liquid component, the component (A) containing, based in each case on the amount of the component (A), at least one non-epoxy polymer dispersion or one non-epoxy redispersion powder comprising emulsion polymers redispersible in an aqueous medium, in amounts of from 2 to 100 parts by weight, polystyrene particles, in amounts of from 0.01 to 10 parts by weight, hollow ceramic microspheres, in amounts of from 0.1 to 60 parts by weight, hollow synthetic microspheres, in amounts of from 0.01 to 30 parts by weight, optionally, from 2 to 160 parts by weight of at least one inorganic filler or mineral selected from the group consisting of calcium carbonate $SiO_2$, $SiO_2$ in the form of quartz sand, or combinations thereof, optionally, at least one further additive selected from the group consisting of wetting agents, antifoams, preservatives and/or thickeners, in amounts of, altogether, from 0.01 to 5 parts by weight, and the component (B) containing, based in each case on the amount of the component (B), at least one cement binder, in amounts of from 1 to 100 parts by weight, optionally, from 2 to 200 parts by weight of at least one inorganic filler or mineral selected from the group consisting of calcium carbonate, limestone powder, $SiO_2$, $SiO_2$ in the form of quartz sand, or combinations thereof, and, at least one dispersant inert to the binder, in amounts of from 1 to 1000 parts by weight.

7. The building material composition as claimed in claim 6, wherein the at least one dispersant comprises an organic compound that is liquid under atmospheric pressure and has a boiling point or boiling range at atmospheric pressure of at least 200° C.; and the dispersant is selected from organic hydrocarbons; oils; plasticizers and mixtures thereof.

* * * * *